United States Patent [19]

Wiese et al.

[11] 4,418,921
[45] Dec. 6, 1983

[54] MECHANICAL SEAL

[75] Inventors: Winfred J. Wiese, Whittier; Joseph A. Marsi, Rancho Palos Verdes, both of Calif.

[73] Assignee: Borg-Warner Corporation, Chicago, Ill.

[21] Appl. No.: 261,870

[22] Filed: May 8, 1981

[51] Int. Cl.³ .............................................. F16J 15/34
[52] U.S. Cl. .................................................. 277/96.1
[58] Field of Search ............................ 277/96.1, 81 R

[56] References Cited

U.S. PATENT DOCUMENTS

| | | | |
|---|---|---|---|
| 3,813,103 | 5/1974 | Wiese | 277/27 |
| 4,114,900 | 9/1978 | Wiese | 277/27 |
| 4,261,581 | 4/1981 | Hershey | 277/96.1 |
| 4,323,255 | 4/1982 | Wiese | 277/96.1 |

Primary Examiner—Robert I. Smith
Attorney, Agent, or Firm—Aubrey L. Burgess

[57] ABSTRACT

A mechanical seal assembly comprising stationary rotating seal rings having opposed faces which remain parallel to one another during operation or defect to become convex in order to provide a convergent path for leakage across the opposed faces.

4 Claims, 18 Drawing Figures

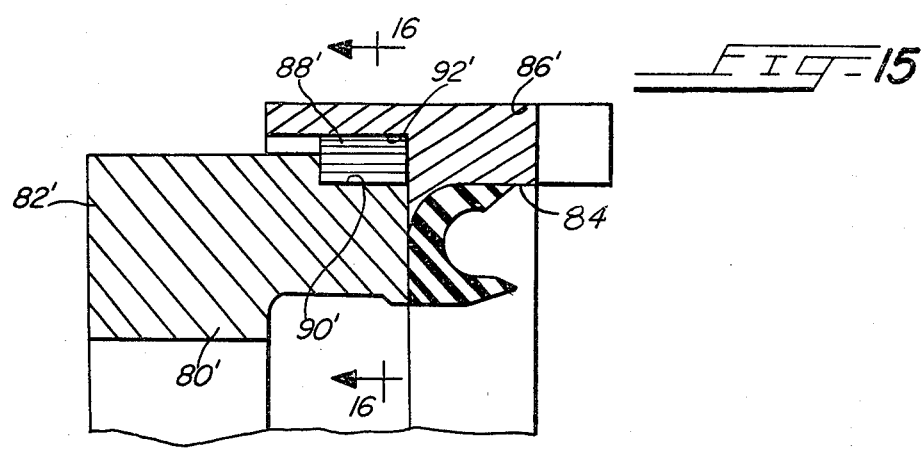
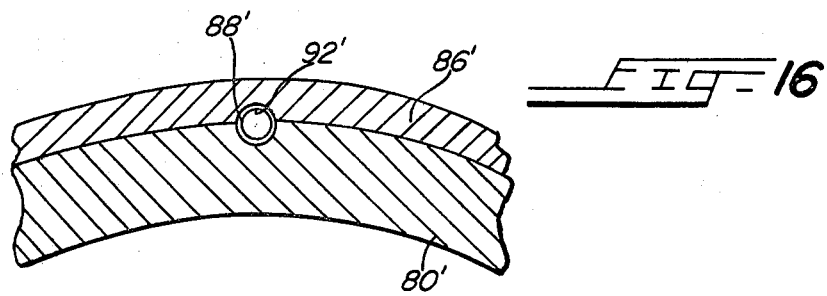
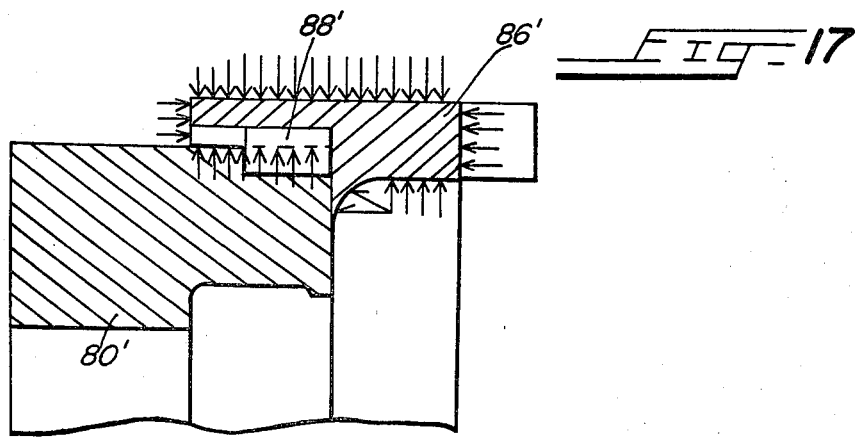
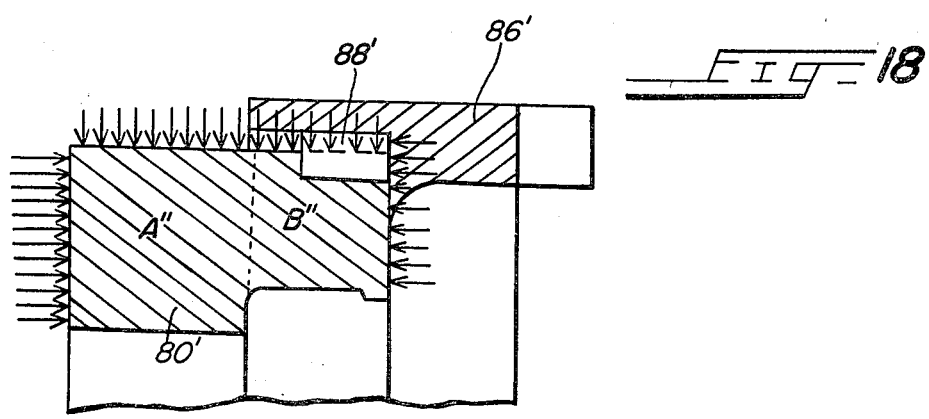

MECHANICAL SEAL

BACKGROUND OF THE INVENTION

Mechanical seal assemblies comprising stationary and rotating seal rings having faces opposed to one another are well known in the art. Generally, the stationary ring is connected to a housing and the rotating ring is connected to a rotatable shaft. The faces are lapped to the necessary flatness prior to assembly.

In many of the known seal assemblies, a back-up or compressing ring is located behind the rotating seal ring, the compression ring being connected to the rotating seal ring by a drive ring and one or more drive pins or keys, the keys being located in milled slots in the seal ring and in axially aligned slots in the back-up or compression ring. Ideally, the lapped faces of the seal rings are parallel to one another so that when leakage occurs between the faces, the pressure gradient produced acts as a separating force offsetting the closing force produced by the housing pressure acting on one seal face. Where high pressures are encountered, it is not always possible to keep the lapped surfaces flat. In some arrangements, the back-up ring has an outer diameter at its end adjacent to the seal ring which is approximately equal to that of the seal ring. The outer diameter of the back-up ring is larger at its other end and it has a cavity to receive a U-cup and the like. Because of the pressures on the seal ring and the back-up ring, the back-up ring distorts causing distortion of the seal ring and its lapped face. The lapped face becomes concave, thus providing a divergent seal leak path with a material reduction in seal leakage and a high unit load at a peripheral line of contact, conditions which are undesirable. A large amount of heat will be generated in the small contact surfaces involved and with reduced leakage, there is less heat being transferred from the seal faces, causing warpage of the ring leading to seal leakage. This will cause a sudden chilling of the lapped surfaces and heat checking of one or both of the seal rings.

SUMMARY OF THE INVENTION

According to the invention to be described herein, an improved mechanical seal assembly comprising seal rings having lapped opposing faces is described. One of the seal rings is engaged by a back-up ring which is pressure loaded toward the seal ring by a compression spring or the like. The seal assembly is constructed in such a manner that: (1) the seal ring and the back-up ring are in compression and a driving ring is uniformly loaded, thus eliminating distortion of these parts or (2) the construction is such that one of the seal rings will distort in a predictable manner, such that its lapped face becomes moderately convex and thus provides a convergent leakage path between the opposed seal faces.

DRAWINGS

FIG. 1 is a partial view, some of which is in section, of the prior art seal assembly and is labeled "PRIOR ART;"

FIGS. 2 and 3 are partial sectional views taken on lines 2—2 and 3—3, respectively, of FIG. 1 and are also labeled "PRIOR ART;"

FIG. 15 is a partial view, some of which is in section, of still another embodiment of the seal assembly constructed according to this invention.

FIG. 16 is a partial sectional view taken on line 16—16 of FIG. 15; and

FIGS. 17 and 18 are schematic illustrations showing the pressure loadings on various elements of the assembly of FIG. 15.

DETAILED DESCRIPTION

Figure 1:
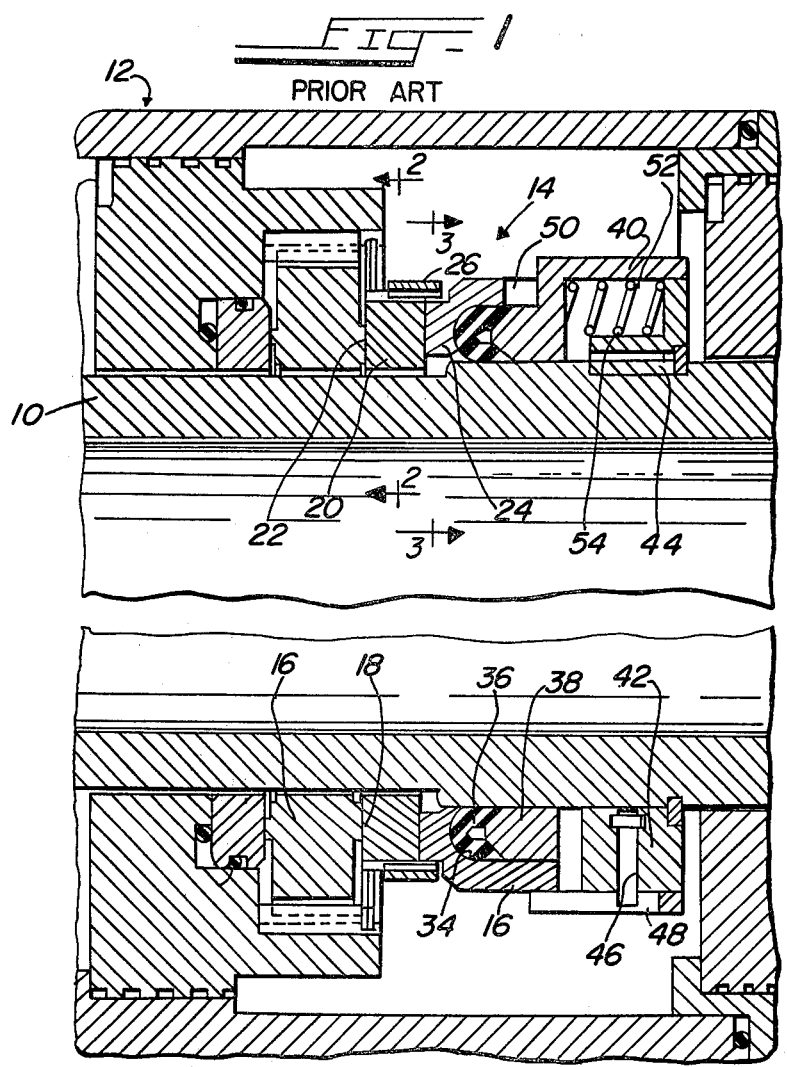
Figure 2:
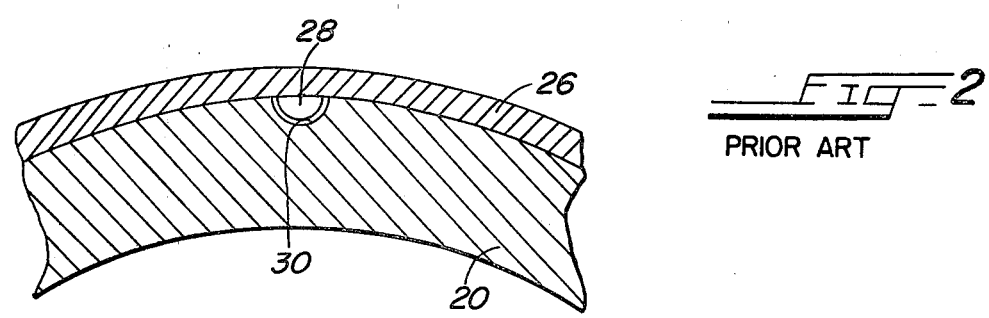
Figure 3:
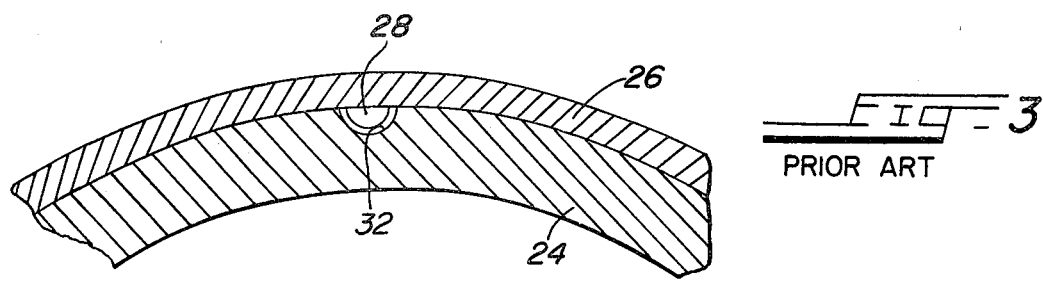

To assist in the understanding of this invention, the prior art is illustrated in FIGS. 1 to 4 of the drawings which are labeled with the legend "PRIOR ART." The prior art seal assembly is generally disclosed in United States letters U.S. Pat. No. 3,813,103 and comprises essentially a rotatable sleeve 10 adapted to be affixed to a rotatable shaft which extends from a pump housing (not shown). Concentrically disposed about the rotatable sleeve 10 is a non-rotatable multiple part housing assembly 12 adapted to be mounted on the pump housing. A mechanical seal assembly, generally identified as 14, is associated with the sleeve 10 and the housing assembly 12.

The seal assembly 14 comprises a non-rotatable seal ring 16 keyed to the housing assembly 12 and having a radial lapped seal face 18, and a rotatable seal ring 20 having a lapped seal face 22 opposing the seal face 18.

The rotatable seal ring 20 is connected to a back-up ring 24 by a drive ring 26 and generally three keys 28 spot welded to the ring 26 (one being shown in FIGS. 2 and 2) received in slots 30 and 32 in the seal ring 20 and the back-up ring 24. The drive ring 24 defines, with the sleeve 10, a cavity 34 to receive an elastomeric U-cup 36 and an expander 38 engages the rear of the U-cup 36. The expander 38 has a skirt 40 extending axially therefrom about a drive ring 42 which is keyed at 44 to the sleeve 10. The drive ring 42, at circumferentially spaced locations, has a suitable number of radial drive pins 46 engaged in elongated slots 48 in the skirt 40 to transmit rotation to the skirt 40. Rotation is imparted to the back-up ring 24 by suitable lugs 50 on the ring 24 which project into slots 48 in the skirt 40. Drive ring 42 is provided with a plurality of cavities 52, each receiving a coiled compression spring 54 urging the expander 38 toward the U-cup 36 and thus urging the seal faces 18 and 22 toward each other. The construction permits limited axial movement of the expander 38 and its skirt 40 relative to the drive ring 42.

Figure 4:
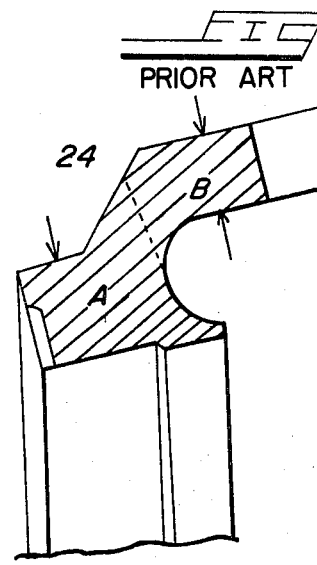
FIG. 4 is a view similar to FIG. 1 illustrating the distortion of one of the seal rings of the prior art construction; it is labeled "PRIOR ART;"

FIG. 4 illustrates the result (somewhat exaggerated) of pressure loading on the back-up ring of prior art construction where the back-up ring is divided, for explanation purposes, into sections A and B. The pressure on section A is applied to both ends and the periphery. The peripheral pressure compresses this section inwardly. With section A being compressed and married to section B which is in a free state—not in tension or compression, a point in section A is made to revolve around a point in section B, thus causing the surface of the back-up ring engaging the seal ring 20 to become concave. This concave surface supports the seal ring 20 and the concavity is reflected through the seal ring 20 to the face 22. The concave condition of the face 22 creates a divergent seal leak path and a high unit load at the peripheral line of contact between the seal faces 18 and 22.

In the description of the invention which follows, only parts of the seal assembly, for example, the rotatable seal ring, the back-up ring assembly and the U-cup will be specifically referred to, it being understood that these parts replace like-named parts in the seal assembly illustrated in FIG. 1.

Figure 5:
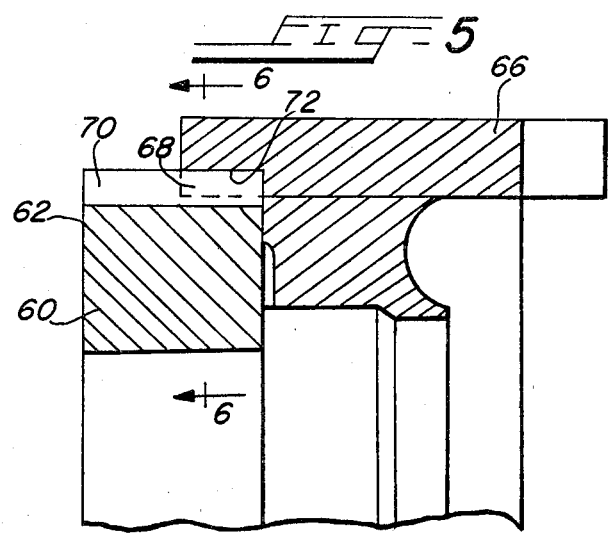
FIG. 5 is a partial view, some of which is in section, of a seal assembly constructed according to this invention.
Figure 6:
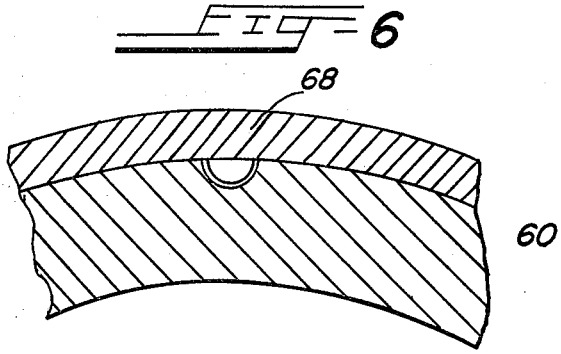
FIG. 6 is a partial sectional view taken on line 6—6 of FIG. 5.

One form of the invention is illustrated in FIGS. 5 to 9 inclusive. FIG. 5 illustrates a sub-structure comprising a rotatable seal ring 60 having a lapped seal face 62 (which is opposed to a lapped seal face of a stationary or non-rotatable seal ring in a complete assembly), a back-up ring 64 and a drive ring 66 surrounding and extending beyond the back-up ring and overlapping the seal ring 60. The drive ring 66 is coupled to the seal ring 60 by generally three drive keys 68 spot welded to the ring 66 and received in slots 70 and 72 in the seal ring 60 and the drive ring 66, respectively. The drive ring 66 is drivingly connected at its rear to the expander (as shown in FIG. 1).

Figure 7:
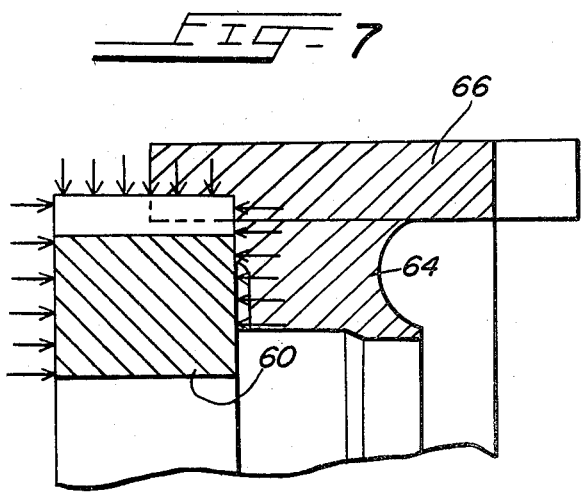
FIGS. 7, 8 and 9 are schematic illustrations showing the pressure loadings on various elements of the assembly of FIGS. 5 and 6.
Figure 8:
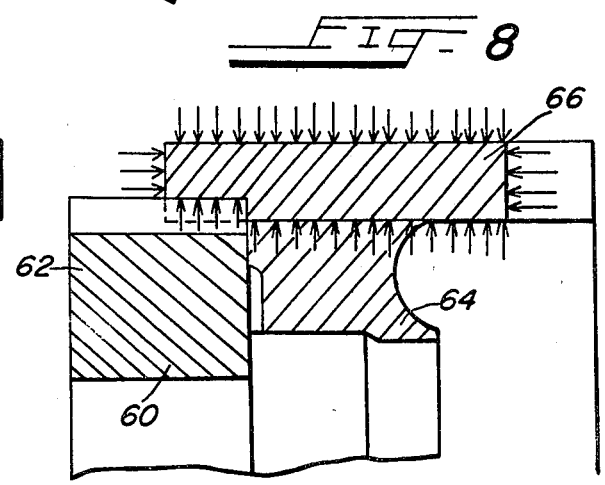
Figure 9:
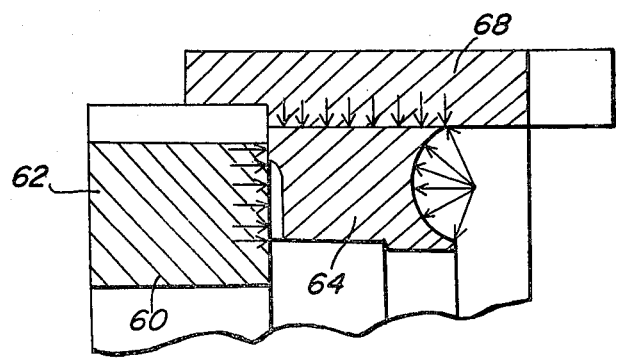
Figure 10:
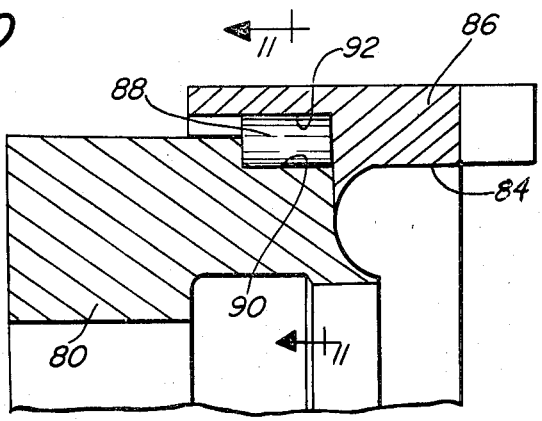
FIG. 10 is a partial view, some of which is in section, of another embodiment of a seal assembly constructed according to this invention.
Figure 11:
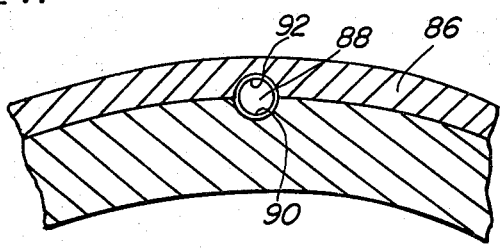
FIG. 11 is a partial sectional view taken on line 11—11 of FIG. 10.

The pressure loading on the seal ring 60, the drive ring 66 and the back-up ring 64 is illustrated in FIGS. 7, 8 and 9, respectively.

The seal ring 60 and the back-up ring 64 are both in compression because of their peripheral loads and should remain relatively unchanged from their original condition. The driving ring 66, with its substantially uniform loading on all sides, should not affect the mating flat surfaces on the seal ring 60 and the back-up ring 64.

The driving ring 66 is centered about the shaft and/or sleeve 10 by the expander. The ring 66 thus centers other parts of the seal about the shaft and/or sleeve and substantially prevents parts from moving off center and damaging the shaft and/or the sleeve.

The parts 60 and 64 are separate parts with lapped surfaces opposing one another. The joint as constructed presents no compressive load problems and thus the part 64 has no effect on the flatness of the face 62.

Other forms of the invention are illustrated in FIGS. 10 to 14, inclusive, and FIGS. 15 to 18, inclusive. These two forms differ from each other in the shape of the cavity to receive the U-cap (as illustrated in FIG. 1), otherwise they are substantially the same. The FIGS. 15 to 18 form is constructed to use a U-cup which is the subject matter of allowed U.S. application, Ser. No. 66,102, filed Aug. 13, 1979 now U.S. Pat. No. 4,241,927.

On FIGS. 10 to 14, inclusive, there is illustrated a substructure comprising a rotatable seal ring 80 which has a seal face 82 and which rearwardly extends to define a portion of a cavity 84 to receive the U-cup (not shown). Surrounding at least a portion of the seal ring 80 is a drive ring 86; the drive ring 80 and the seal ring 86 are connected by a plurality of round, free floating drive pins 88 received in blind half-round slots 90 and 92 in the seal ring 80 and the drive ring 86, respectively.

In FIGS. 15 to 18, inclusive, a similar subassembly is illustrated in which comparable parts are identified with primed reference characters. The major difference in the two forms is the shape of the cavity 84' to receive the U-cup which is slightly different as previously explained.

The drive rings 86 and 86' function in a manner similar to the drive ring 66 in the FIG. 5 embodiment.

Figure 12:
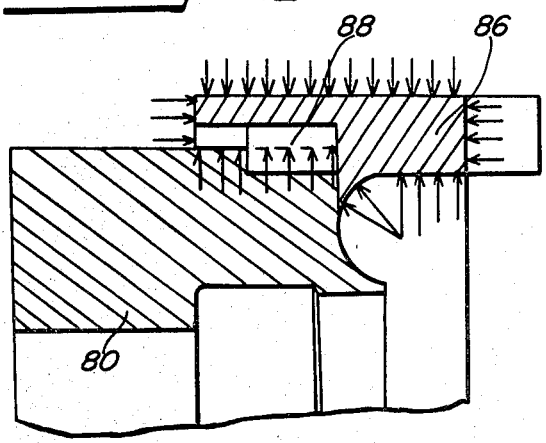
FIGS. 12 and 13 are schematic illustrations showing the pressure loadings on various elements of the assembly of FIG. 10.
Figure 13:
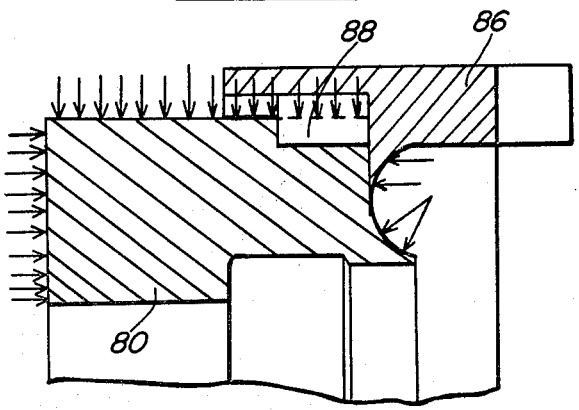

The pressure loading on the seal rings 80 and 80' are shown in FIGS. 13 and 18, respectively, and the pressure loading on the drive rings 86 and 86' are shown in FIGS. 12 and 17, respectively. In that the drive rings 86, 86' are substantially uniformly loaded on all sides, there will be no effect on the seal faces 82, 82'.

Figure 14:
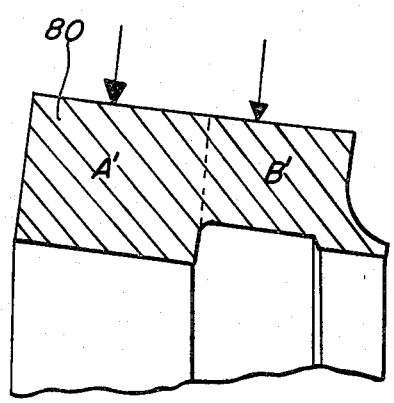
FIG. 14 is an illustration of the distortion of a seal ring of the FIG. 10 embodiment.

If the seal rings 80, 80' are each divided with an imaginary line as indicated in FIGS. 14 and 18 to provide sections A', A" and B', B", it is obvious that the section A', A" will be structurally stronger than the sections B', B"; the peripheral loading on these sections, see FIGS. 13 and 17, compresses both sections inwardly such that the weaker B', B" sections will reduce in size more than the stronger A', A" sections. The resultant distortion of the seal rings 80, 80' is illustrated in FIGS. 14 and 18. This causes the seal faces 82, 82' to become convex.

We claim:

1. A mechanical seal assembly for use with a housing and a rotatable shaft, comprising:
    a stationary seal ring connected to said housing and encircling and spaced from said shaft;
    a rotatable seal ring connected to and encircling said shaft;
    said seal rings having opposed seal faces;
    means connecting said rotatable seal ring to said shaft while permitting limited axial movement thereof with respect to said shaft;
    said connecting means comprising an axially elongated, generally cylindrical drive ring;
    said drive ring having a first portion closely surrounding at least a part of said rotatable seal ring rearwardly of the seal face thereof and a second portion extending rearwardly of said rotatable seal ring;
    lug means on said second portion of said drive ring drivingly connecting said drive ring to said shaft;
    a cavity defined in part by said drive ring in said second part thereof;
    an elastomer U-cup in said cavity;
    a U-cup follower engaging said U-cup;
    spring means urging said U-cup follower and thus said U-cup into said cavity, said U-cup urging said rotatable seal ring toward said stationary seal ring; and
    means drivingly connecting said drive ring to the outside of said rotatable seal ring.

2. A mechanical seal assembly as recited in claim 1, wherein said means drivingly connecting said drive ring and said rotatable seal ring comprise drive pins, parts of which are in said rotatable seal ring and parts of which are in said drive ring.

3. A mechanical seal assembly as recited in claim 1, further comprising a back-up ring located rearwardly of and abutting said rotatable seal ring and defining in part said cavity, said drive ring surrounding said back-up ring and extending rearwardly thereof.

4. A mechanical seal assembly as recited in claim 1, in which said rotatable seal ring has a reduced inner diameter portion located rearwardly of its seal face, said reduced diameter portion defining said cavity with said drive ring.

* * * * *